(12) United States Patent
Park et al.

(10) Patent No.: US 11,362,329 B2
(45) Date of Patent: Jun. 14, 2022

(54) NEGATIVE ELECTRODE ACTIVE PARTICLE AND METHOD FOR MANUFACTURING THE SAME

(71) Applicant: LG CHEM, LTD., Seoul (KR)

(72) Inventors: Su Jin Park, Daejeon (KR); Yong Ju Lee, Daejeon (KR); Eun Kyung Kim, Daejeon (KR); Hyun Chul Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/952,767

(22) Filed: Nov. 19, 2020

(65) Prior Publication Data

US 2021/0075009 A1    Mar. 11, 2021

Related U.S. Application Data

(62) Division of application No. 15/333,525, filed on Oct. 25, 2016, now Pat. No. 10,879,531.

(30) Foreign Application Priority Data

Oct. 26, 2015   (KR) .......................... 10-2015-0148807

(51) Int. Cl.
*H01M 4/485* (2010.01)
*H01M 4/1395* (2010.01)
(Continued)

(52) U.S. Cl.
CPC ......... *H01M 4/485* (2013.01); *H01M 4/0404* (2013.01); *H01M 4/0471* (2013.01);
(Continued)

(58) Field of Classification Search
CPC ....... H01M 10/0525; H01M 2004/027; H01M 2220/20; H01M 4/0404; H01M 4/0435;
(Continued)

(56) References Cited

U.S. PATENT DOCUMENTS

2011/0244334 A1   10/2011   Kawada
2014/0322606 A1   10/2014   Lee et al.
(Continued)

FOREIGN PATENT DOCUMENTS

EP    1 936 518 A1   6/2008
JP    2007-59213 A    3/2007
(Continued)

OTHER PUBLICATIONS

Machine Translation JP2015153520(A) (Year: 2015).*

*Primary Examiner* — Victoria H Lynch
(74) *Attorney, Agent, or Firm* — Birch, Stewart, Kolasch & Birch, LLP

(57) ABSTRACT

A negative electrode active material particle and a method for preparing the same are provided. The negative electrode active material particle includes $SiO_x$ ($0<x\leq2$) and $Li_2Si_2O_5$, and includes less than 2 wt % of $Li_2SiO_3$ and $Li_4SiO_4$.

9 Claims, 1 Drawing Sheet

(51) Int. Cl.
    *H01M 4/04*         (2006.01)
    *H01M 4/134*      (2010.01)
    *H01M 4/36*         (2006.01)
    *H01M 4/1391*     (2010.01)
    *H01M 4/131*      (2010.01)
    *H01M 4/587*      (2010.01)
    *H01M 10/0525*    (2010.01)
    *H01M 4/02*         (2006.01)

(52) U.S. Cl.
    CPC ........... *H01M 4/131* (2013.01); *H01M 4/134* (2013.01); *H01M 4/1391* (2013.01); *H01M 4/1395* (2013.01); *H01M 4/364* (2013.01); *H01M 4/366* (2013.01); *H01M 4/587* (2013.01); *H01M 4/0435* (2013.01); *H01M 10/0525* (2013.01); *H01M 2004/027* (2013.01); *H01M 2220/20* (2013.01)

(58) Field of Classification Search
    CPC .... H01M 4/0471; H01M 4/131; H01M 4/134; H01M 4/1391; H01M 4/1395; H01M 4/364; H01M 4/366; H01M 4/485; H01M 4/587; Y02E 60/10

See application file for complete search history.

(56) References Cited

U.S. PATENT DOCUMENTS

2016/0087267 A1    3/2016   Yoshio et al.
2018/0257942 A1    9/2018   Takeshita et al.
2018/0309160 A1*  10/2018  Kizaki ................. H01M 4/386

FOREIGN PATENT DOCUMENTS

JP        2015153520 A    8/2015
KR      10-1006121 B1    1/2011
KR   10-2014-0070482 A    6/2014

* cited by examiner

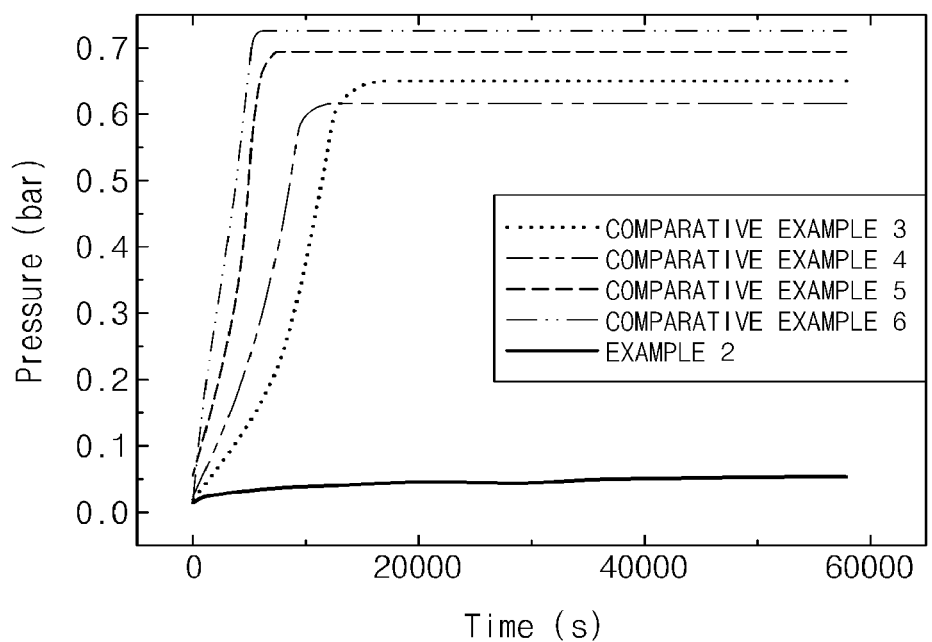

NEGATIVE ELECTRODE ACTIVE PARTICLE AND METHOD FOR MANUFACTURING THE SAME

CROSS-REFERENCE TO RELATED APPLICATION(S)

This application is a Divisional of Application No. 15/333,525 filed on Oct. 25, 2016, now U.S. Pat. No. 10,879,531, which claims the benefit of Korean Patent Application No. 10-2015-0148807, filed on Oct. 26, 2015, in the Korean Intellectual Property Office, the entire contents of all of which are expressly incorporated by reference into the present application.

TECHNICAL FIELD

The present disclosure relates to a negative electrode active material particle and a method for preparing the same.

BACKGROUND

Due to a rapid increase in the use of fossil fuels, there is a growing demand for the use of alternative or clean energy. The fields which are most actively being developed as part of this are those of electrical power generation and energy storage.

Currently, secondary batteries are a representative example of an electrochemical device that utilizes electrochemical energy, and the extent of the usage thereof is increasing. Recently, as technological advancements and the demand for mobile devices such as mobile computers, mobile phones, cameras, etc. have increased, there has been a rapid increase in demand for secondary batteries as sources of energy. Among such secondary batteries, much research has been done on lithium secondary batteries, which exhibit high energy densities and operating potentials, and have long cycle lifetimes and low self-discharge rates, and having been commercialized, are in wide use.

As interest in environmental issues has increased, much research has been devoted to electric vehicles, hybrid electric vehicles and the like which can replace fossil fuel powered vehicles such as gasoline powered vehicles and diesel powered vehicles, which are among the leading causes of air pollution. Nickel-metal hydride batteries have been the most widely used power source for such electric vehicles, hybrid electric vehicles and the like, but lithium secondary batteries, which have high energy densities and discharge voltages, are being actively researched for use in such vehicles, and have achieved a certain degree of commercialization.

Typically, lithium secondary batteries are composed of a positive electrode including a lithium transition metal oxide, a negative electrode including a carbon-based active material, and an electrolyte. Lithium ions released from a positive electrode active material are intercalated into a negative electrode active material such as a carbon particle by an initial charge, and during discharge, are deintercalated. Energy transfer occurs as the lithium ions travel back and forth between the two electrodes in this way, thus making charging/discharging possible.

Meanwhile, the carbon-based active material for negative electrodes has excellent stability and reversibility, but is limited in terms of capacity. Thus, in order to be used in mid- to large-scale energy storage systems and the like, the capacity must be at least two times the current capacity. Accordingly, a novel negative electrode active material is needed in order to achieve such mid- to large-scale energy storage systems.

Recently, negative electrode active materials capable of increasing the capacity by a factor of four or more are being developed using non-carbon-based materials such as silicon (Si) and tin (Sn)

However, such materials have a limitation in which the volume of the negative electrode and the secondary battery expand due to gas generated after a charge/discharge cycle, and thus are far from being commercialized.

DISCLOSURE OF THE INVENTION

Technical Problem

Accordingly, an aspect of the present disclosure is to provide a non-carbon-based negative electrode active material particle which has a high capacity and may suppress the generation of gas caused by side reactions.

Another aspect of the present disclosure is to provide a method for preparing the negative electrode active material particle.

Another aspect of the present disclosure is to provide a negative electrode including the negative electrode active material particle, and a secondary battery including the same.

Technical Solution

According to an aspect of the present invention, there is provided a negative electrode active material particle which includes $SiO_x$ ($0<x\leq2$) and $Li_2Si_2O_5$, and which includes less than 2 wt % of $Li_2SiO_3$ and $Li_4SiO_4$.

The $SiO_x$ ($0<x\leq2$) may include a nanocomposite structure in which Si and $SiO_2$ are mixed therein.

In accordance with another aspect of the present disclosure, a method for preparing a negative electrode active material is provided. The method includes forming a lithium-silicon composite oxide by mixing a silicon oxide represented by $SiO_x$ ($0<x\leq2$) with a lithium precursor and then performing a first heat treatment (first step); and performing a second heat treatment on the lithium-silicon composite oxide (second step).

Here, the silicon oxide may include a nanocomposite structure in which Si and $SiO_2$ are mixed therein.

In accordance with another aspect of the present disclosure, a negative electrode which comprises a negative electrode composition including the negative electrode active material, and a secondary battery comprising the same are provided.

Advantageous Effects

A negative electrode active material according to the present disclosure includes $SiO_x$ ($0<x\leq2$) and $Li_2Si_2O_5$, and includes less than 2 wt % of $Li_2SiO_3$ and $Li_4SiO_4$. As a result, reactions between a non-aqueous binder included in the negative electrode active material and side products are prevented, and thus there is an effect of suppressing the generation of gas from the negative electrode after charging/discharging. Therefore, a lithium secondary battery having enhanced stability may be manufactured.

BRIEF DESCRIPTION OF THE DRAWINGS

FIG. 1 is a graph showing the amount of gas generation according to time for slurries including the negative electrode active materials in Example 2 and Comparative Examples 3 to 6 of the present disclosure.

DETAILED DESCRIPTION

Hereinafter, the present disclosure is described in greater detail to facilitate understanding thereof.

The wordings or terms used in the specification and claims are not limited to their typical or dictionary definitions. Rather wordings or terms as used herein are to be understood as defined by the inventor to best convey the technical concepts of the present disclosure.

The terms used in the specification are merely used for describing exemplary embodiments, and are not intended to limit the present disclosure. Singular forms are intended to include the plural forms as well, unless the context clearly indicates otherwise.

The terms "including", "equipped with", "having", etc., when used in the specification, specify the presence of stated features, integers, operations, elements, or combinations thereof, but do not preclude the presence or addition of one or more other features, integers, operations, elements, or combinations thereof.

Specifically, an embodiment of the present disclosure provides a negative electrode active material particle which includes $SiO_x$ (0<x≤2), $Li_2Si_2O_5$, $Li_2SiO_3$ and $Li_4SiO_4$, wherein $Li_2SiO_3$ and $Li_4SiO_4$ are included to be less than 2 wt %.

The $SiO_x$ (0<x≤2) may include a nanocomposite structure in which Si and $SiO_2$ are mixed therein. Here, the composition (x) may be determined by the ratio between silicon and oxygen. For example, when Si and $SiO_2$ in the $SiO_x$ (0<x≤2) are mixed in a 1:1 molar ratio, the $SiO_x$ may be represented as $SiO_x$ where x=1.

Here, in the negative electrode active material of the present disclosure, the Si included in $SiO_x$ (0<x≤2) is a component that can substantially cause an electrochemical reaction as lithium ions which have been deintercalated from a positive electrode active material are occluded/released.

The Si may be crystalline or amorphous. When the Si is crystalline, the Si crystal grain size may be 500 nm or smaller, desirably 300 nm or smaller, and more desirably 0.05 to 20 nm.

Here, the Si crystal grain size may be measured using x-ray diffraction (XRD) analysis or electron microscopy (SEM, TEM). Specifically, by performing XRD (Bruker AXS D4 Endeavor XRD) analysis (voltage: 35 kV, current 28 mA, 2θ range: 10° to 120°, step size: 0.019°, time per step: 600 sec), the crystal grain size of the Si phase may be calculated via the Scherrer equation using the full width at half maximum values of the Si peaks.

In the Si particle, the reaction in which lithium ions are electrochemically occluded and released is accompanied by an extremely complex crystal change. For example, as the reaction in which lithium ions are electrochemically occluded and released proceeds, the composition or crystal structure of the Si particle changes to Si (crystal structure: Fd3m), LiSi (crystal structure: I41/a), $Li_2Si$ (crystal structure: C2/m), $Li_7Si_2$ (Pbam), or $Li_{22}Si_5$ (F23) and the like. While going through such a Li—Si reaction process, the Si particle may expand in volume by a factor of four or more.

The negative electrode active material of the present disclosure includes a component in which a silicon oxide represented by $SiO_x$ (0<x≤2) has been doped beforehand with lithium ions such that instead of the Li—Si bonding reaction, lithium silicate (Li—Si—O) which is capable of reducing the initial non-reversibility is formed, thereby enhancing initial efficiency while minimizing structural collapse of the negative electrode active material.

Moreover, in the negative electrode active material of the present disclosure, the $SiO_2$ included in the $SiO_x$ (0<x≤2) may also be crystalline or amorphous. The crystalline $SiO_2$ may include quartz, cristobalite, or tridymite. When the $SiO_2$ is amorphous, it may be indicated as being included in the amorphous structure when analyzed using XRD.

$Li_2Si_2O_5$ included in the negative electrode active material of the present disclosure is a product obtained by alloying a silicon oxide with lithium, and less than 10 wt %, specifically 2 to 10 wt %, and more specifically 2 to 5 wt % may be included with respect to the total weight of the negative electrode active material. If 2 wt % or less of the $Li_2Si_2O_5$ is included, the amount is very small, and thus the initial efficiency-enhancing effect of alloying beforehand with Li is insignificant. Conversely, when more than 10 wt % of the $Li_2Si_2O_5$ is included, there is an excess amount of an inactive phase, and thus an increase in resistance may result in a decrease in the discharge capacity per unit weight, and the negative electrode active material may be in an unstable state.

$Li_2SiO_3$ and $Li_4SiO_4$ included in the negative electrode active material of the present disclosure is an intermediate product generated when lithiumizing silicon oxide to form $Li_2Si_2O_5$. When present in the negative electrode active material, the $Li_2SiO_3$ and $Li_4SiO_4$ react with an aqueous binder and disadvantageously cause gas to be generated. Thus, it is desirable for 2 wt % or less—as measured by XRD—of the $Li_2SiO_3$ and $Li_4SiO_4$ to be included in the negative electrode active material, and in particular, it is desirable that most of these components exist in the interior of the negative electrode active material.

The $Li_2SiO_3$ and $Li_4SiO_4$ may be removed or remain in small amounts by undergoing a phase change induced by a simple heat treatment. Specifically, by mixing silicon oxide with a lithium precursor to form a lithium-silicon composite oxide and then performing a heat treating operation at 700° C. or above, a phase change from $Li_2SiO_3$ and $Li_4SiO_4$ to $Li_2Si_2O_5$ occurs to thereby decrease the concentration of $Li_2SiO_3$ and $Li_4SiO_4$ in the negative electrode active material to 2 wt % or lower. In particular, the $Li_2SiO_3$ and $Li_4SiO_4$ are mostly removed from the surface of the negative electrode active material. When more than 2 wt % remains in the negative electrode active material, the $Li_2SiO_3$ and $Li_4SiO_4$ may react with an aqueous binder during charging/discharging, thereby generating gas from the negative electrode.

Here, whether or not $Li_2SiO_3$ and $Li_4SiO_4$ remain in the negative electrode active material may be determined by XRD analysis using an x-ray diffractometer (Bruker AXS D4-Endeavor XRD).

Specifically, after mixing the prepared negative electrode material particle with MgO in a 8:2 weight ratio, XRD Rietveld analysis method may be used to measure the content ratios of the components Si, $Li_2Si_2O_5$, $Li_2SiO_3$, and $Li_4SiO_4$ in the negative electrode active material. Here, a voltage of 40 kV and a current of 40 mA were applied, the 2θ range was 10° to 90°, and scanning was performed using a step size of 0.05°. The slit used was a variable divergence slit (6 mm), and a large PMMA holder (diameter=20 mm) was used to remove background noise due to the PMMA holder.

The average particle diameter (D50) of the negative electrode active material may be 0.05 nm to 30 μm, specifically, 0.5 nm to 15 μm.

The average particle diameter (D50) of the negative electrode active material may be measured using a laser scattering method or an electrical resistance method (Coulter counter method), and specifically, the laser scattering method was used.

The laser scattering method is a method which utilizes the simultaneous and combined effects of diffraction, refraction, reflection, and absorption, wherein the particle size is derived based on the principle in which the scattering intensity is proportional to the particle size and the scattering angle is inversely proportional to the particle size. Particles passing through a laser beam scatter light, and the scattered light forms a different scattering pattern for each angle, which is analyzed by being detected by a photodetector array. In such laser scattering methods, fine particles are beyond the detection range and thus are mostly undetected.

In the present disclosure, the measurement may be performed on a specimen in the form of a dispersion formed by dispersing the active material in water, which is the solvent, and adding a surfactant as needed.

As described above, in order to suppress the formation of a non-reversible lithium oxide phase during the initial charging process of the battery, in the negative electrode active material according to the present disclosure, a component obtained by alloying a silicon oxide represented by $SiO_x$ (0<x≤2) with lithium may be included to thereby increase the initial efficiency. In particular, the content of intermediate products—such as $Li_2SiO_3$ and $Li_4SiO_4$—produced while alloy of the negative electrode active material of the present invention with lithium is formed, is reduced by or most of such intermediate products are removed by a heat treatment of two steps. Accordingly, the limitation of the intermediate products reacting with an aqueous binder such that gas is generated may be overcome.

The negative electrode active material for a secondary battery of the present disclosure may further include—as needed—a carbon coating layer on the surface of the $SiO_x$ (0<x≤2).

Moreover, the carbon coating layer may include a crystalline or an amorphous carbon coating layer. The crystalline carbon coating layer may be formed by mixing the inorganic or inorganic oxide particle with a crystalline carbon in a solid or liquid phase and then heat treating. The amorphous carbon coating layer may be formed by using a method in which the inorganic or inorganic oxide particle is coated with an amorphous carbon precursor and then carbonized by being heat treated.

Here, representative examples of the crystalline carbon may include graphene and graphite. Specific examples of the amorphous carbon precursor may be any one selected from the group consisting of resins, a coal-based pitch, tar, and low molecular weight heavy oil. The examples of resin may be a phenol resin, a naphthalene resin, a polyvinyl alcohol resin, a urethane resin, a polyimide resin, a furan resin, a cellulose resin, an epoxy resin, a polystyrene resin, and the like.

The carbon coating layer is commonly included in an amount of less than 20 wt %, for example, 1 wt % to 10 wt % based on the total weight of the negative electrode material particle.

Here, when the carbon coating layer exceeds 20 wt %, the thickness of the carbon coating layer is excessively thick such that lithium intercalation and deintercalation are inhibited, and thus, the discharge capacity is reduced and an initial efficiency may be reduced due to a non-reversible reaction between amorphous carbon and lithium.

Provided is a method for preparing a negative electrode active material—which can achieve such effects—according to an embodiment of the present disclosure. The method includes mixing a silicon oxide represented by $SiO_x$ (0<x≤2) with a lithium precursor and then performing a first heat treatment to from a lithium-silicon composite oxide (first step); and performing a second heat treatment on the lithium-silicon composite oxide (second step).

Hereinafter, each operation of a method for preparing a negative electrode active material according to the present disclosure will be described in detail.

In the method for preparing a negative electrode active material particle according to the present disclosure, a first step is an operation for forming a lithium-silicon composite oxide by mixing a silicon oxide represented by $SiO_x$ (0<x≤2) with a lithium precursor and then performing a first heat treatment.

Here, the silicon oxide may be a nanocomposite structure in which Si and $SiO_2$ are mixed therein in an approximately 1:1 molar ratio, and may include SiO.

Moreover, the lithium precursor may include a lithium powder or a lithium salt, and specifically, at least one selected from the group consisting of Li powder, LiH, LiAlH, LiOH, $Li_2CO_3$, LiCl, $Li_2O$, and LiF may be used.

The silicon oxide and the lithium precursor may be mixed in a 70:30 to 97:3 weight ratio.

Here, when the mixing ratio by weight of the lithium precursor is less than 3, the anticipated effect of alloying beforehand with lithium ions is slight, and when greater than 30, lithium and silicon excessively react to form, in addition to the lithium-silicon composite oxide, a lithium-silicon alloy. Consequently, the negative electrode active material may be unstable against the external atmosphere and moisture.

The first heat treatment may be performed for 4 to 6 hours at a temperature of 650 to 750° C.

During the first heat treatment, $Li_2Si_2O_5$ which is a lithium-silicon oxide, and $Li_2SiO_3$ and $Li_4SiO_4$, which are intermediate products, may be produced.

If the first heat treatment is performed at a temperature below 650° C. or for less than 4 hours, the alloying with lithium may not be desirably performed, and thus $Li_2SiO_3$, $Li_4SiO_4$, and $Li_2Si_2O_5$ may not be formed. Conversely, when the first heat treatment is performed at a temperature above 750° C. or for longer than 6 hours, the alloying with lithium may be excessive, and thus Si capacity may be reduced.

Meanwhile, the method of the present disclosure may further include—as needed—forming a carbon coating layer on the surface of the silicon oxide before mixing the silicon oxide with the lithium precursor.

Here, the operation for forming the carbon coating layer may typically be performed using a CVD method using soft carbon, hard carbon, graphene, amorphous carbon, crystalline carbon (graphite), etc., or a pitch coating method Here, the carbon coating layer is commonly included in an amount of less than 20 wt %, for example, 1 wt % to 10 wt % based on the total weight of the negative electrode material particle.

When the carbon-coated silicon oxide is mixed with the lithium precursor, a portion of the lithium-silicon oxide is also present in the formed carbon coating layer, and the reactivity with water is determined by the type of the lithium-silicon composite oxide. Here, when the carbon coating layer exceeds 20 wt %, the thickness of the carbon coating layer is excessively thick such that lithium intercalation and deintercalation are inhibited, and thus the discharge capacity is reduced and an initial efficiency may be reduced due to a non-reversible reaction between amorphous carbon and lithium.

In the method for preparing a negative electrode active material according to the present disclosure, a second step is an operation for inducing a phase transformation of the $Li_2SiO_3$, and $Li_4SiO_4$—produced when forming the lithium-silicon composite oxide—into $Li_2Si_2O_5$.

The second heat treatment operation may be performed at a temperature of 700 to 1,100° C., specifically 900 to 1,100° C., for 1 to 3 hours, specifically, 1 to 2 hours.

Since most of the $Li_2SiO_3$ and $Li_4SiO_4$—intermediate products produced in addition to the final product $Li_2Si_2O_5$—undergoes a phase transformation to $Li_2Si_2O_5$, the $Li_2SiO_3$ and $Li_4SiO_4$ may be reduced in content or almost entirely removed in the negative electrode active material by the second heat treatment. In particular, as a result of the second heat treatment, $Li_2SiO_3$ and $Li_4SiO_4$ may remain in small amounts in the interior of the negative electrode active material, and be nearly completely removed from the surface.

Here, when the second heat treatment operation is performed at a temperature below 700° C. or for less than 1 hour, the phase transformation effect of $Li_2SiO_3$, $Li_4SiO_4$ is very slight. When the second heat treatment operation is preformed at a temperature above 1,100° C. of for longer than 3 hours, $SiO_2$ and Si phases grow separately in the interior of the prepared negative electrode active material particle, and thus a volume control effect may be reduced.

An embodiment of the present disclosure provides a negative electrode including a current collector and a negative electrode composition including the negative electrode active material particle, formed on at least one surface of the current collector.

Specifically, the negative electrode composition may be prepared by mixing the negative electrode active material of the present disclosure, a conductive material, and the binder in a solvent to prepare a negative electrode material slurry composition, applying the slurry onto the negative electrode current collector, and then drying and roll-pressing.

Here, since there is almost no $Li_2SiO_3$ and $Li_4SiO_4$ present in the negative electrode active material, or if present, a very small amount, the typical problem of the aqueous binder reacting with $Li_2SiO_3$ and $Li_4SiO_4$ to generate a gas may be overcome.

The negative electrode active material may be included in an amount of 80 wt % to 99 wt % based on the total weight of the negative electrode active material slurry composition.

The binder is a component which facilitates the bonding between the conductive material and the active material or current collector, and typically, may be included in an amount of 0.1 wt % to 20 wt % based on the total weight of the negative electrode active material slurry composition. Examples of the binder may include polyvinylidene fluoride (PVdF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated-EPDM, styrene butadiene rubber (SBR), fluorocarbon rubber, and various copolymers thereof, and specifically, the binder may include an aqueous binder composed of carboxymethyl cellulose (CMC), styrene butadiene rubber (SBR), or a mixture thereof.

The conductive material may be used without particular limitation so long as it has suitable conductivity without causing adverse chemical changes in the battery, and is commonly added in an amount of 1 wt % to 20 wt % based on the total weight of the negative electrode material slurry composition. Any conductive agent may be used without particular limitation so long as it has suitable conductivity without causing adverse chemical changes in the battery, and, for example, a graphite such as a natural graphite or a synthetic graphite; a carbon black such as acetylene black, Ketjen black, channel black, furnace black, lamp black, or thermal black; a carbon-based material such as carbon black, acetylene black, Ketjen black, channel black, furnace black, lamp black, and thermal black; a conductive fiber such as a carbon fiber or a metal fiber; a fluorocarbon; a metal powder such as aluminum or nickel powder; a conductive whisker such as zinc oxide or potassium titanate; a conductive metal oxide such as titanium oxide; or a conductive material such as a polyphenylene derivative.

The solvent may include water or an organic solvent such as n-methyl-2-pyrrolidone (NMP), and may be used in an amount such that desirable viscosity is obtained when the negative electrode active material as well as selectively the binder and the conductive agent are included. For example, the solvent may be included so that a concentration of solid content including the negative electrode active material as well as selectively the binder and the conductive agent is in a range of 50 wt % to 95 wt %, for example, 70 wt % to 90 wt %.

An embodiment of the present disclosure provides a secondary battery which includes a positive electrode, a negative electrode, and an electrolyte solution, wherein the negative electrode is the negative electrode of the present disclosure.

The positive electrode may be prepared by coating a positive electrode material slurry composition including a positive electrode active material, a binder, a conductive agent, and a solvent onto a positive electrode current collector, and then drying and roll-pressing.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where 0<Y<1), $LiMn_{2-Z}Ni_ZO_4$ (where 0<Z<2), etc.), lithium-nickel-cobalt-based oxide (e.g., $LiNi_{1-Y1}Co_{Y1}O_2$ (where 0<Y1<1), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2), etc.), lithium-nickel-manganese-cobalt-based oxide (e.g., $Li(Ni_PCo_QMn_R)O_2$ (where 0<P<1, 0<Q<1, 0<R<1, and P+Q+R=1) or $Li(Ni_{P1}Co_{Q1}Mn_{R1})O_4$ (where 0<P1<2, 0<Q1<2, 0<R1<2, and P1+Q1+R1=2), etc.), or lithium-nickel-cobalt-transition metal (M) oxide (e.g., $Li(Ni_{P2}Co_{Q2}Mn_{R2}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and P2, Q2, R2 and S2 are atomic fractions of each independent elements, wherein 0<P2<1, 0<Q2<1, 0<R2<1, 0<S2<1, and P2+Q2+R2+S2=1), etc.), and any one thereof or a compound of two or more thereof may be included. Among these materials, in terms of the improvement of the capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2)$, or lithium nickel cobalt aluminum oxide (e.g., $LiNi_{0.8}Co_{0.15}Al_{0.05}O_2$, etc.). In consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 to 99 wt % based on a total weight of the positive electrode material slurry composition.

Meanwhile, the binder for the positive electrode is a component that assists in the binding between the active material and the conductive agent and in the binding with the current collector, wherein the binder is commonly added in an amount of 1 wt % to 20 wt % based on the total weight of the positive electrode material slurry composition. Various types of binder polymers may be used, including polyvinylidene fluoride-hexafluoropropylene copolymer (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, ethylene-propylene-diene monomer (EPDM), sulfonated-EPDM, styrene butadiene rubber (SBR), fluorocarbon rubber, polyacrylic acid, polymers in which the hydrogen atoms thereof are substituted with Li, Na, or Ca, or various copolymers thereof.

Any conductive agent may be used without particular limitation so long as it has suitable conductivity without causing adverse chemical changes in the battery, and, is commonly added in an amount of 1 wt % to 20 wt % based on the total weight of the positive electrode material slurry composition. Any conductive agent may be used without particular limitation so long as it has suitable conductivity without causing adverse chemical changes in the battery, and, for example, a graphite such as a natural graphite or a synthetic graphite; a carbon black such as acetylene black, Ketjen black, channel black, furnace black, lamp black, or thermal black; a carbon-based material such as carbon black, acetylene black, Ketjen black, channel black, furnace black, lamp black, and thermal black; a conductive fiber such as a carbon fiber or a metal fiber; a fluorocarbon; a metal powder such as aluminum or nickel powder; a conductive whisker such as zinc oxide or potassium titanate; a conductive metal oxide such as titanium oxide; or a conductive material such as a polyphenylene derivative.

The solvent may include water or an organic solvent such as n-methyl-2-pyrrolidone (NMP), and may be used in an amount such that desirable viscosity is obtained when the positive electrode active material as well as selectively the binder and the conductive agent are included. For example, the solvent may be included so that a concentration of solid content including the positive electrode active material as well as selectively the binder and the conductive agent is in a range of 50 wt % to 95 wt %, for example, 70 wt % to 90 wt %.

The electrolyte solution may include a non-aqueous organic solvent and a metal salt.

An aprotic organic solvent may be used as the non-aqueous organic solvent, for example, n-methyl-2-pyrollidone, propylene carbonate, ethylene carbonate, butylene carbonate, dimethyl carbonate, diethyl carbonate, gamma-butyrolactone, 1,2-dimethoxyethane, tetrahydroxyfuran, 2-methyl tetrahydrofuran, dimethyl sulfoxide, 1,3-dioxolane, formamide, dimethylformamide, dioxolane, acetonitrile, nitromethane, methyl formate, methyl acetate, triphosphate ester, trimethoxymethane, a dioxolane derivative, sulfolane, methyl sulfolane, 1,3-dimethyl-2-imidazolidone, a propylene carbonate derivative, a tetrahydrofuran derivative, ether, methyl propionate, or ethyl propionate.

A lithium salt may be used as the metal salt, and a material that easily dissolves in the non-aqueous solution may be used as the lithium salt, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, etc.

The positive electrode and negative electrode current collector having conductivity and not chemically changing the battery is not particularly limited. For example, copper, stainless steel, aluminum, nickel, titanium, baked carbon, or aluminum or stainless steel surface treated with carbon, nickel, titanium, or silver and the like may be used.

According to another embodiment of the present disclosure, a battery module including the secondary battery as a unit cell, and a battery pack including the same are provided. The battery module and the battery pack include a secondary battery having a high capacity, a long lifetime, and a high initial efficiency, and may be used as a power source for a mid- to large-scale device selected from the group consisting of electric vehicles, hybrid electric vehicles, plug-in hybrid electric vehicles, and electrical energy storage systems.

Hereinafter, examples of the present disclosure are described in detail in order to allow the present disclosure to be carried out by a person with ordinary skill in the art. However, the present disclosure may be embodied in various forms and is not limited to the examples described herein.

EXAMPLES

Example 1

(First Step)

A mixture was formed by mixing a silicon oxide ($SiO_x$ that is Si and $SiO_2$ are mixed in a 1:1 molar ratio in $SiO_x$ ($0<x\leq 2$)) having an average particle diameter of 4 μm with a lithium metal powder (Li) in a 97:3 weight ratio. A lithium-silicon composite oxide including SiO along with $Li_2Si_2O_5$, $Li_2SiO_3$, and $Li_4SiO_4$ was formed by performing a first heat treatment on the mixture in an argon atmosphere at 700° C. for 5 hours.

(Second Step)

A negative electrode active material particle was prepared by performing a second heat treatment in an argon atmosphere at 900° C. for 2 hours on the lithium-silicon composite oxide formed above.

After mixing the prepared active material particle in a 8:2 weight ratio with MgO, which has excellent crystallinity and does not have XRD peaks that overlap with the active material, XRD Rietveld analysis method is performed by an x-ray diffractometer (Bruker AXS D4-Endeavor XRD). On the basis of a graph obtained from the XRD Rietveld analysis method, the content ratio of each of the components—Si, amorphous structure ($SiO_2$, etc.), $Li_2Si_2O_5$, $Li_2SiO_3$ and $Li_4SiO_4$-present in the prepared negative electrode active material particle was measured, and the results are displayed in Table 1.

Specifically, after mixing the prepared active material particle with MgO in a 8:2 weight ratio, the content ratios of Si, $Li_2Si_2O_5$, $Li_2SiO_3$, and $Li_4SiO_4$ present in the negative electrode active material particle could be measured using the Rietveld analysis method. Specifically, a voltage of 40 kV and a current of 40 mA were applied, the 2θ range was 10° to 90°, and scanning was performed using a step size of 0.05°. Here, the slit used was a variable divergence slit (6 mm), and a large PMMA holder (diameter=20 mm) was used to remove background noise due to the PMMA holder.

Comparative Example 1

(First Step)

A mixture was formed by mixing a silicon oxide ($SiO_x$) (0.5≤x≤1.5) having an average particle diameter (D50) of 4 μm with a lithium metal powder (Li) in a 97:3 weight ratio. A lithium-silicon composite oxide including SiO along with $Li_2Si_2O_5$, $Li_2SiO_3$, and $Li_4SiO_4$ was formed by heat treating the mixture in an argon atmosphere at 700° C. for 5 hours.

Using the XRD Rietveld analysis method, the content ratio of each of the components—Si, amorphous structure ($SiO_2$, etc.), $Li_2Si_2O_5$, $Li_2SiO_3$, and $Li_4SiO_4$—present in the negative electrode active material particle was measured, and the results are displayed in Table 1

Comparative Example 2

A mixture was formed by mixing a silicon oxide ($SiO_x$) (0.5≤x≤1.5) having an average particle diameter (D50) of 4 μm with a lithium metal powder (Li) in a 97:3 weight ratio. A lithium-silicon composite oxide including SiO along with $Li_2Si_2O_5$, $Li_2SiO_3$, and $Li_4SiO_4$ was formed by heat treating the mixture in an argon atmosphere at 750° C. for 5 hours.

By treating the above-formed lithium-silicon composite oxide with an acidic aqueous solution, a negative electrode active material was prepared. Using the XRD Rietveld analysis method, the content ratio of each of the components—Si, amorphous structure ($SiO_2$, etc.), $Li_2Si_2O_5$, $Li_2SiO_3$, and $Li_4SiO_4$—present in the prepared negative electrode active material particle was measured, and the results are displayed in Table 1.

TABLE 1

| | Component ratio (wt %) | | | | |
| --- | --- | --- | --- | --- | --- |
| | Si | $Li_2SiO_3$ | $Li_4SiO_4$ | $Li_2Si_2O_5$ | Amorphous structure |
| Example 1 | 27 wt % | 2 wt % | 0 | 14 wt % | 57 wt % |
| Comparative Example 1 | 26 wt % | 12 wt % | 3 wt % | 3 wt % | 56 wt % |
| Comparative Example 2 | 26 wt % | 14 wt % | 0 | 4 wt % | 56 wt % |

As illustrated in Table 1, it may be confirmed that the negative electrode active material particle of Examples 1 has small amounts-2 wt % and 0 wt % respectively—of $Li_2SiO_3$ and $Li_4SiO_4$ remaining, but the negative electrode active material particles prepared in Comparative Examples 1 and 2 have a $Li_2Si_2O_5$ concentration that is actually lower than the $Li_2SiO_3$ and $Li_4SiO_4$ content.

That is, in the case of the negative electrode active particle of Comparative Example 1, on which a second heat treatment was not performed, $Li_2SiO_3$ and $Li_4SiO_4$ as well as $Li_2Si_2O_5$ are observed. Here, while large amounts of $Li_2SiO_3$ and $Li_4SiO_4$—12 wt % and 3 wt %, respectively are detected, it may be seen that the concentration of $Li_2Si_2O_5$ is 3 wt %, which is equal to or significantly lower than those of the intermediate products, $Li_2SiO_3$ and $Li_4SiO_4$.

In addition, when, as in Comparative Example 2, acid treatment rather than the second heat treatment is performed, $Li_4SiO_4$ is completely removed (0 wt %), whereas it is difficult to remove $Li_2SiO_3$, and thus it may be seen that 14 wt % of $Li_2SiO_3$ which is greater than $Li_2Si_2O_5$ (4 wt %) is detected. Thus, it can be anticipated that a mitigating effect of gas generation will be low in the negative electrode active material prepared according to the method of Comparative Example 2.

Example 2

(Manufacturing Negative Electrode)

A mixture was formed by mixing the negative electrode active material particle prepared in Example 1, a conductive material, carbon black, and a binder, SBR/CMC, in a weight ratio of 96:2:2. The mixture was placed in distilled water as a solvent and stirred for 60 minutes to prepare a negative electrode active material slurry composition having a solid material content of 85 wt %.

Using a doctor blade, the negative electrode active material slurry composition was applied to a thickness of about 60 μm on a copper current collector having a thickness of 10 μm, and after being dried for 0.5 hours at 100° C. in a hot-air dryer, was dried once more for 4 hours at 120° C. in a vacuum and roll-pressed to manufacture a negative electrode plate.

(Manufacturing Positive Electrode)

After introducing 97.45 wt % of $LiNi_{0.6}Mn_{0.2}Co_{0.2}O_2$, 0.5 wt % of synthetic graphite (SFG6, Timcal) powder as a conductive material, 0.7 wt % of carbon black (Ketjenblack, ECP), 1.15 wt % of polyvinylidene fluoride (PVDF, S6020, Solvay), and 0.2 wt % of polyvinylidene fluoride (PVDF, S5130, Solvay) in a n-methyl-2-pyrollidone solvent, a positive electrode active material slurry composition having a solid material content of 85 wt % was prepared by stirring for 30 minutes with a mechanical stirrer.

Using a doctor blade, the positive electrode active material slurry composition was applied to a thickness of 60 μm on an aluminum current collector having a thickness of 20 μm, and after being dried for 0.5 hours at 100° C. in a hot-air dryer, was dried once more for 4 hours at 120° C. in a vacuum and roll-pressed to manufacture a positive electrode plate.

(Manufacturing Secondary Battery)

An electrolyte solution for a secondary battery was manufactured by dissolving 1.0 M of $LiPF_6$ in a non-aqueous organic solvent composed of ethylene carbonate/ethyl methyl carbonate/diethyl carbonate (EC:EMC:DEC=3:5:2 by vol %).

An electrode assembly was manufactured by interposing a porous polyethylene separator between the manufactured negative and positive electrodes, and after disposing the electrode assembly in a case for a secondary battery, a lithium secondary battery was manufactured by injecting the electrolyte solution into the case.

Comparative Example 3

A negative electrode active material slurry composition, and a negative electrode and secondary battery including the same were prepared in the same manner as in Example 2 except that the negative electrode active material particle prepared in Comparative Example 1, instead of the negative electrode active material particle prepared in Example 1, was included.

Comparative Example 4

A negative electrode active material slurry composition, and a negative electrode and secondary battery including the same were prepared in the same manner as in Example 2 except that the negative electrode active material particle prepared in Comparative Example 2, instead of the negative electrode active material particle prepared in Example 1, was included.

Comparative Example 5

A negative electrode active material slurry composition, and a negative electrode and secondary battery including the same were prepared in the same manner as in Example 2 except that $Li_2SiO_3$ particle, instead of the negative electrode active material particle prepared in Example 1, was included as the negative electrode active material particle.

Comparative Example 6

A negative electrode active material slurry composition, and a negative electrode and secondary battery including the same were prepared in the same manner as in Example 2 except that $Li_4SiO_4$ particle, instead of the negative electrode active material particle prepared in Example 1, was included as the negative electrode active material particle.

Experimental Example

Experimental Example 1

Each of the negative electrode active material slurries (4 g) prepared in Example 2 and Comparative Examples 3 to 6 was placed in a stainless steel container having a pressure sensor attached thereto, and after cutting off external air, the increased pressure due to gas generated inside the container was measured by the pressure sensor, and the results thereof are displayed in Table 2 and FIG. 1.

TABLE 2

| Material | Time at which gas was generated (s) | Pressure (bar) |
| --- | --- | --- |
| Example 2 | >50,000 | <0.05 |
| Comparative Example 3 | 12,000 | 0.65 |
| Comparative Example 4 | 12,000 | 0.62 |
| Comparative Example 5 | 8,700 | 0.69 |
| Comparative Example 6 | 6,500 | 0.73 |

As shown in Table 2 and FIG. 1, in the case of the negative electrode active material slurry composition in Example 2, even after an amount of time has passed, the pressure due to gas was less than 0.05 bar, which is an insignificant level.

In Contrast, in the case of Comparative Examples 3 and 4, it may be seen that as the pressure increased rapidly after about 12,000 seconds, a large amount of gas was generated—at least about 90% more than in Example 2.

In particular, from Table 2, it may be seen that in the case of Comparative Examples 3 and 4, in which the second heat treatment was not performed, the effect of removing $Li_2SiO_3$ and $Li_4SiO_4$ was slight, and thus an excessive amount of gas was generated, while in the case of Example 1, in which the second heat treatment was performed, most of the $Li_2SiO_3$ and $Li_4SiO_4$ underwent a phase transformation to $Li_2Si_2O_5$, and thus gas generation was suppressed.

As in Comparative Examples 5 and 6, it may be seen that a large amount of gas was generated from the negative electrode active material slurry composition including $Li_2SiO_3$ and $Li_4SiO_4$.

Although exemplary embodiments of the present disclosure have been described, the present disclosure is not limited thereto. Rather, it is understood that various changes and modifications made by a person skilled in the art using the basic concepts of the disclosure as defined in the claims are within the scope of the disclosure.

What is claimed is:

1. A method for preparing a negative electrode active material particle, the method comprising:
   mixing a silicon oxide represented by $SiO_x$ (0<x≤2) with a lithium precursor and then performing a first heat treatment to form a lithium-silicon composite oxide (first step); and
   performing a second heat treatment on the lithium-silicon composite oxide (second step),
   wherein the first heat treatment is performed for 4 to 6 hours at a temperature of 650° C. to 750° C., and
   wherein the second heat treatment is performed for 1 to 3 hours at a temperature of 900° C. to 1,100° C.

2. The method of claim 1, wherein the lithium precursor is at least one selected from the group consisting of lithium metal powder and lithium salt.

3. The method of claim 2, wherein the lithium precursor is at least one selected from the group consisting of Li metal powder, LiOH, $Li_2CO_3$, LiCl, $Li_2O$, and LiF.

4. The method of claim 1, wherein the silicon oxide and the lithium precursor are mixed in a 70:30 to 97:3 weight ratio.

5. The method of claim 1, further comprising step for forming a carbon coating layer on a surface of the silicon oxide before mixing the silicon oxide with the lithium precursor.

6. The method of claim 5, wherein the carbon coating layer is formed in an amount of 1 wt % to 10 wt % based on a total weight of the negative electrode material particle.

7. The method of claim 1, wherein the negative electrode active material particle comprises $SiO_x$ (0<x≤2); and $Li_2Si_2O_5$,
   which includes less than 2 wt % of $Li_2SiO_3$ and $Li_4SiO_4$.

8. The method of claim 1, wherein the $SiO_x$ (0<x≤2) includes SiO.

9. The method of claim 8, wherein the $SiO_x$ (0<x≤2) includes a nanocomposite structure in which Si and $SiO_2$ are mixed in a 1:1 molar ratio.

* * * * *